(12) United States Patent
Tarighat Mehrabani et al.

(10) Patent No.: US 9,203,494 B2
(45) Date of Patent: Dec. 1, 2015

(54) COMMUNICATION DEVICE WITH BEAMFORMING AND METHODS FOR USE THEREWITH

(71) Applicant: BROADCOM CORPORATION, Irvine, CA (US)

(72) Inventors: Alireza Tarighat Mehrabani, Irvine, CA (US); Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/011,525

(22) Filed: Aug. 27, 2013

(65) Prior Publication Data

US 2015/0055689 A1    Feb. 26, 2015

Related U.S. Application Data

(60) Provisional application No. 61/867,636, filed on Aug. 20, 2013.

(51) Int. Cl.
*H04B 7/06* (2006.01)
*H04B 7/08* (2006.01)

(52) U.S. Cl.
CPC .............. *H04B 7/0617* (2013.01); *H04B 7/086* (2013.01)

(58) Field of Classification Search
USPC .................. 375/219, 267, 295, 299, 324, 349
See application file for complete search history.

(56) References Cited

U.S. PATENT DOCUMENTS

| | | | |
|---|---|---|---|
| 2005/0213556 A1* | 9/2005 | Wax et al. | 370/349 |
| 2010/0054223 A1* | 3/2010 | Zhang et al. | 370/338 |

* cited by examiner

*Primary Examiner* — Kabir A Timory
(74) *Attorney, Agent, or Firm* — Garlick & Markison; Bruce E. Stuckman

(57) ABSTRACT

A radio frequency (RF) transceiver includes an RF transmitter that generates a transmit signal to a remote communication device based on outbound data. An RF receiver generates inbound data based on a received signal from the remote communication device. The RF receiver includes a channel equalizer and generates post equalization performance data. A beamform controller generates a plurality of beamforming weights to adjust a beamforming pattern of an antenna array based on the post equalization performance data.

20 Claims, 4 Drawing Sheets

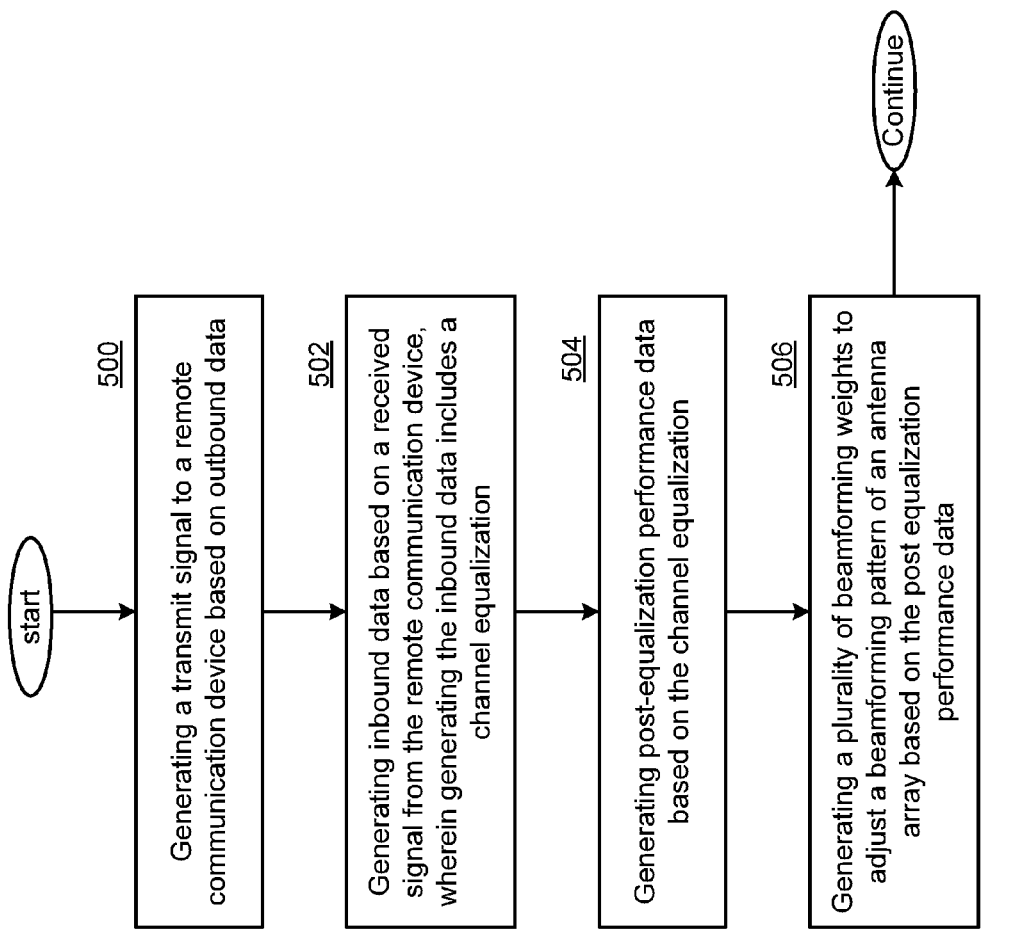

COMMUNICATION DEVICE WITH BEAMFORMING AND METHODS FOR USE THEREWITH

CROSS REFERENCE TO RELATED PATENTS

The present application claims priority based on 35 USC 119 to the provisionally filed application entitled, COMMUNICATION DEVICE WITH BEAMFORMING AND METHODS FOR USE THEREWITH, having Ser. No. 61/867,636, filed on Aug. 20, 2013, the contents of which are incorporated herein for any and all purposes, by reference thereto.

BACKGROUND

1. Technical Field

Various embodiments relate generally to wireless communication and more particularly to communication devices that employ beamforming antennas to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the millimeter wave V-band of 55-64 GHz.

60 GHz or other millimeter wave based communications systems can rely heavily on transmit and receive beamforming to improve communications range. This is due to the fact that at millimeter wavelengths, propagation path loss (which is proportional to carrier frequency) is generally too severe to allow for acceptable communication range without deploying beamforming at either or both sides of the wireless link. Therefore, systems designed to operate at 60 GHz bands can employ mechanisms to enable transmit and receive beamforming adaptation as part of normal mode of operation. Today, both mainstream standardizations for 60 GHz communications, i.e. Wireless-HD and Wireless Gigabit Alliance (WiGig), deploy methods to facilitate beamforming training and optimization. As these 60 GHz based systems rely on beamforming gain to establish and maintain a wireless link, their performance (and hence user experience) is highly dependent on the performance and accuracy of beamforming training.

BRIEF DESCRIPTION OF THE SEVERAL VIEWS OF THE DRAWING(S)

FIG. 5 is a flow diagram of an embodiment of a method.

DETAILED DESCRIPTION

Figure 1:
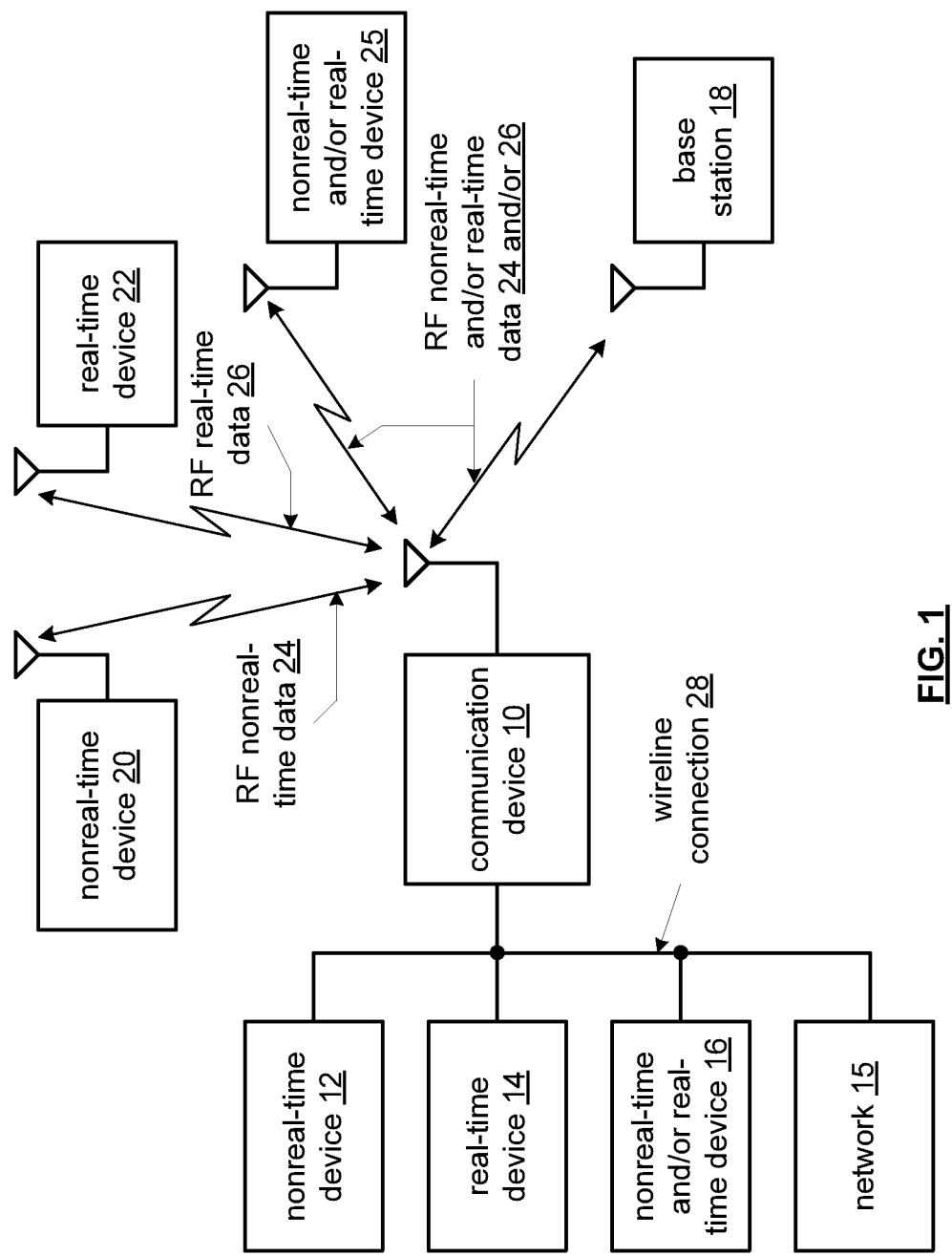
FIG. 1 is a schematic block diagram of an embodiment of a wireless communication system.

FIG. 1 is a schematic block diagram of an embodiment of a communication system. In particular a communication system is shown that includes a communication device 10 that communicates real-time data 26 and/or non-real-time data 24 wirelessly with one or more other devices such as base station 18, non-real-time device 20, real-time device 22, and non-real-time and/or real-time device 25. In addition, communication device 10 can also optionally communicate over a wireline connection with network 15, non-real-time device 12, real-time device 14, non-real-time and/or real-time device 16.

In an embodiment the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, WiGig, NGMS, IEEE 802.11a, ac, ad, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Long term Evolution (LTE), Personal Communication Services (PCS), or other mobile wireless protocol or other wireless communication protocol, either standard or proprietary. Further, the wireless communication path can include multiple transmit and receive antennas, as well as separate transmit and receive paths that use single carrier modulation to bi-directionally communicate data to and from the communication device 10.

Communication device 10 can be a mobile phone such as a cellular telephone, a local area network device, personal area network device or other wireless network device, a personal digital assistant, tablet, game console, personal computer, laptop computer, or other device that performs one or more functions that include communication of voice and/or data via the wireless communication path. Further communication device 10 can be an access point, base station or other network access device that is coupled to a network 15 such as the Internet or other wide area network, either public or private, via wireline connection 28. In an embodiment, the real-time and non-real-time devices 12, 14, 16, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment, the communication device 10 includes a wireless transceiver that operates in conjunction with an antenna array for beamforming and that includes one or more features or functions of the various embodiments that are described in greater detail in association with FIGS. 2-5 that follow.

Figure 2:
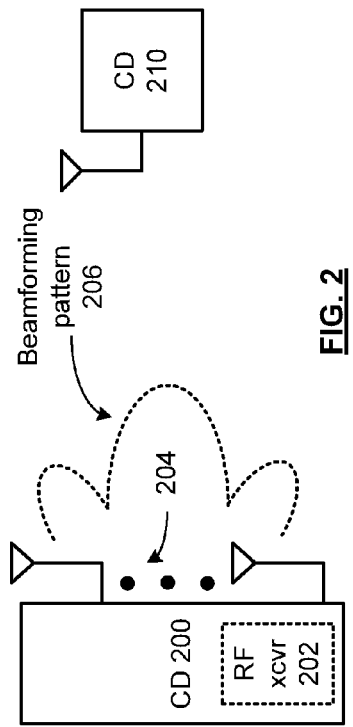
FIG. 2 is a schematic block diagram of an embodiment of a wireless communication system.

FIG. 2 is a schematic block diagram of an embodiment of a wireless communication system. The communication devices 200 and 210 can be implemented as the communication device 10, base station 18, non-real-time device 20, real-time device 22, and non-real-time, real-time device 25, or other communications devices. In particular, communication device 200 includes an RF transceiver 202 and an array antenna (antenna array) 204. RF transceiver 202 transmits an outbound RF signal containing outbound data via array antenna 204 to one or more remote communication devices such as a communication device 210. In addition, array antenna 204 receives an inbound RF signal containing inbound data from the communication device or devices 210. The array antenna 204 is configurable to a plurality of different beamforming patterns 206.

In an embodiment, the RF transceiver 202 includes a channel equalizer and generates post equalization performance data based on signals received from the communication device 210. A beamform controller generates a plurality of beamforming weights to adjust a beamforming pattern of the antenna array based on the post equalization performance data.

In an embodiment, the communication device 210 can be a non-beamforming device. In this case, the communication device 200 can implement transparent beamforming—beamforming without any implicit involvement from communication device 210, other than the receipt of transmissions from the beamformee. This allows communication device 200 to beamform to improve the channel performance in communications with beamforming incapable devices such as legacy devices, low performance devices or other devices that do not support beamforming. In other embodiments, the communication device 210 can itself be a beamforming device.

Figure 3:
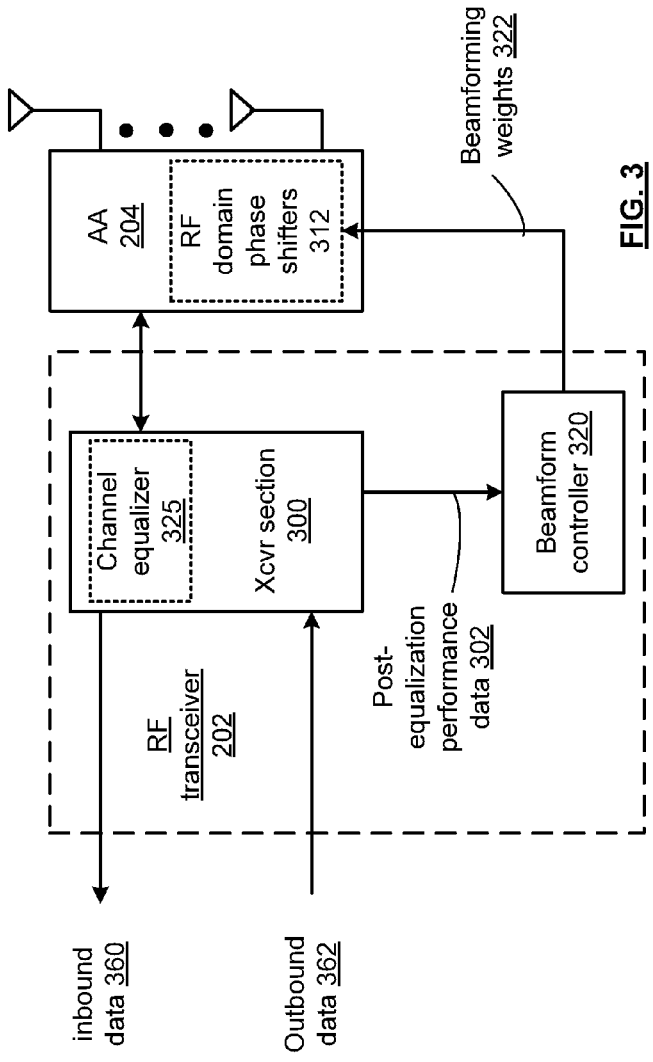
FIG. 3 is a schematic block diagram of an embodiment of an RF transceiver 202.

FIG. 3 is a schematic block diagram of an embodiment of an RF transceiver 202. In particular, an RF transceiver 202 is presented for use with an antenna array 204. The array antenna 204 includes multiple individual antenna elements. Examples of such individual antenna elements include monopole or dipole antennas, three-dimensional in-air helix antenna, aperture antennas of a rectangular shape, horn shaped, etc.; dipole antennas having a conical shape, a cylinder shape, an elliptical shape, etc.; and reflector antennas having a plane reflector, a corner reflector, or a parabolic reflector; meandering pattern or a micro strip configuration. In an embodiment, antenna array 204 includes a plurality of RF domain phase shifters 312 that operate based on a plurality of beamforming weights 322. In particular, the RF domain phase shifters 312 control the phase and/or the amplitude of the signals to and from each individual antenna elements based on the beamforming weights 322 to produce any number of different beamforming patterns. Signals received from a remote communication device are combined in the antenna array 204. The combined signal is then fed through a single-receiver path of transceiver section 300.

In an embodiment, the transceiver section 300 includes a channel equalizer 325 used in processing a downconverted inbound signal from the communication device 210 into inbound data 360. In particular, the channel equalizer 325 can be a single-input digital time domain or frequency domain channel equalizer. The channel equalizer 325 also generates post equalization performance data 302 that indicates a measure of performance of the equalization. The post equalization performance data may include signal-to-noise-ration (SNR), signal-to-noise-interference-ratio (SINR), bit-error-rate (BER), packet-error-rate (PER) or other post equalization performance. The beamform controller 320 generates the plurality of beamforming weights 322 to adjust a beamforming pattern of the antenna array, based on the post equalization performance data 302. In an embodiment, the beamform controller 320 performs a search over a plurality of candidate beamforming patterns to optimize the post equalization performance data 302, either separately or jointly with optimization of the channel equalization by the channel equalizer 325. Such techniques provide an improvement in beamforming gain that can lead to corresponding improvement in overall user experience and system throughput.

Beamform controller 320 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the beamform controller 320 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Consider an example where the transceiver section 300 operates in accordance with WiGig or 802.11ad standards. Most WiGig and IEEE 802.11ad systems deploy single-carrier modulation as a mandatory mode of operation. However, the design of optimal beamforming in the context of single-carrier modulation has not been well studied or analyzed. Existing systems rely on optimizing power of channel response (i.e., $\|h(n)\|^2$), received signal strength indicator (RSSI) or a received signal-to-noise ratio (SNR) to calculate optimal beamforming patterns. While these criteria are believed to be optimal for AWGN propagation channels, they can significantly deviate from an actual optimal solution in the presence of multipath reception and for single-carrier modulation. In the case of single-carrier modulation, the overall receiver performance is highly dependent on actual propagation channel realization. This is due to the fact that single-carrier equalizers (that are typically used in wireless systems) are generally dependent on actual channel realization. For example, two wireless channels with same total received signal power can lead to two different final receiver performance (e.g., separated by 3-4 dB in link margin). Therefore, beam pattern optimization algorithms that do not consider equalizer's performance as part of optimization process can be off by 2-4 dB from achievable solutions.

Furthermore, the beamforming tools developed for standard MIMO systems cannot be reapplied to millimeter wave systems. This is due to the fact that millimeter wave systems deploy phase-shifters such as RF domain phase sifters 312 that operate in the RF domain to perform beamforming; hence only using a single transceiver chain (in contrast to MIMO systems such as IEEE 802.11n).

In an embodiment, the beamform controller 320 performs optimization based on the post equalization performance data 302. This post equalization performance data 302 can be a cost function or other optimization criterion that represents an effective post equalized SNR—for example, the effective SNR that is measured after both beamforming and equalization are applied on the received signal. This post equalization SNR parameter takes into account two components: 1) additive Gaussian noise at the output of equalizer, 2) any residual inter-symbol-interference at equalizer output (that is not equalized).

In this case, the optimization process used by beamform controller 320 to generate/select beamforming weights 322 such that the performance at the output of the channel equalizer 325 is optimized. In an embodiment, the beamform controller 320 optimizes transceiver beam patterns jointly with receiver channel equalization. This can yield significant improvement in network throughput, range, and robustness—compared to existing solutions where beam pattern optimization for single-carrier modulation is based on a RSSI, received SNR or is otherwise decoupled from equalization and the channel profile.

Different approaches can be used by beamform controller 320 to optimize the post equalization performance data 302. For example, iterative search algorithms can be employed as well as closed form solutions. In one approach beamform controller 320 uses closed-form formulas where the effective SNR is computed as a function of estimated propagation channel response. The beamform controller 320 conducts a search over candidate or training beam patterns to find beamforming weights 322 that maximize effective post equalized SNR. This processing can be performed at a relatively slower rate (the rate at which the environment changes), and therefore can be fully implemented by beamforming controller 320 fully in firmware (running on system processor) to avoid any cost associated with dedicated ASIC hardware implementations of beamform controller 320.

Consider the operation of beamform controller 320 in light of the following additional examples. In particular, to implement joint optimization of performance at the output of channel equalizer 325, a closed-form formula considers channel estimation h(n) and input noise variance and calculates the exact effective post equalization SNR for both a frequency-domain equalizer (FDE) and time-domain-equalizer (TDE) implementations. These formulas are then used for finding the optimal beamforming pattern. If equalization methods are modified (e.g., switched from TDE to FDE), the beamform controller 320 can switch to a different beamforming pattern selection.

The following is the process for beamforming optimization when an FDE equalization structure is used by the channel equalizer 325. Consider:

h: an M×1 vector that represents the equivalent time-domain response of channel post beamforming;

$$h_c = \begin{bmatrix} h(1) & \cdots & h(M) \\ \vdots & \ddots & \vdots \\ h(2) & \cdots & h(1) \end{bmatrix}$$

is a circulant matrix which defines the relationship between the transmitted block in time-domain and received block in time-domain;

F: unitary M-point FFT operation
$H=\sqrt{m} \times F \times h$: Frequency domain response of channel
$H_d = \text{diag}(H)$: diagonalized copy of H
And, $h_c = F \times H_d \times F'$.

Consider a received block Y in time-domain is given by:

$$Y = h_c S + N$$

where S is the transmitted block in time-domain and N is the receiver noise in time domain (block of M×1).

FDE equalization can effectively implement the following transfer function from Y to estimation of S (denoted by $\hat{S}$):

$$\hat{S} = W_T \times Y$$

where $$W_T = F[(\sigma_n^2 I + H_d' \times H_d)^{-1} H_d'] F'$$

And consequently, $$\hat{S} = W_T \times (h_c S + N) = (W_T \times h_c) S + W_T \times N$$

In this case, define following transfer functions for signal and noise components:

$$W_S = W_T (F \times H_d \times F') = F[(\sigma_n^2 I + H_d' \times H_d)^{-1} H_d' \times H_d] F'$$

$$W_N = W_T = F[(\sigma_n^2 I + H_d' \times H_d)^{-1} H_d'] F'$$

where $W_S$ defines the transfer function between original transmitted vector S and the estimated vector at the output of equalizer and $W_N$ defines the transfer function from input noise vector to the output of the channel equalizer 325. Both the matrices $W_S$ and $W_N$ have circulant structure. The first row of $W_S$ and $W_N$ is equal to:

$$w_S \triangleq W_S(1,:) = \left( \frac{1}{\sqrt{M}} F' \times \begin{bmatrix} \frac{|H(1)|^2}{\sigma_n^2 + |H(1)|^2} \\ \vdots \\ \frac{|H(M)|^2}{\sigma_n^2 + |H(M)|^2} \end{bmatrix} \right)^T$$

$$w_N \triangleq W_N(1,:) = \left( \frac{1}{\sqrt{M}} F' \times \begin{bmatrix} \frac{H'(1)}{\sigma_n^2 + |H(1)|^2} \\ \vdots \\ \frac{H'(M)}{\sigma_n^2 + |H(M)|^2} \end{bmatrix} \right)^T$$

Given this circulant structure, the effective signal-to-interference-noise-ratio (SINR) for each element of $\hat{S}$ is the same and given as:

$$SINR = \frac{|w_S(1)|^2}{\sum_{i=2}^{i=M} |w_S(i)|^2 + \|w_N\|^2 \sigma_N^2}$$

This can be used as the optimization cost function as follows:

$$\text{optimal beamforming coefficients } C_{opt} = \arg\left(\max_{C \text{ where } \|C\|=1} SINR\right)$$

where "equivalent time-domain response of channel post-beamforming" h (and consequently H) are functions of beamforming coefficient C.

The notation outlined above can be used in a further example when a TDE equalization structure is used by the receiver. An important difference between FDE and TDE optimization process is that TDE optimization process adapts to the equalization by taking into consideration a number of equalizer taps, L, as an input as well. In other words, the optimal beamforming solution becomes a function of the number of TDE taps. A feed-forward TDE equalization implementation with L non-zero time-domain taps can be implemented as follows.

First assume there are no limitations in the number of taps and M taps are used. Then the time-domain equalization coefficients would be given by:

$$W_T = F[(\sigma_n^2 I + H_d' \times H_d)^{-1} H_d'] F'$$

Such that, $$\hat{S} = W_T \times Y$$

For the first element in $\hat{S}$, the transformation vector is given by $$w_T \triangleq W_T(1,:)$$

However, when the number of TDE non-zero taps are limited to only L elements, then the equivalent equalizer coefficients is defined as $\tilde{w}_T$ only contains the largest L elements in $w_T$ and other elements in $\tilde{w}_T$ are forced to zero. Then:

$$\hat{S} = \tilde{W}_T \times (h_c S + N) = (\tilde{W}_T \times h_c) S + \tilde{W}_T \times N$$

In this case, we can define following transfer functions for signal and noise components:

$$W_S = \tilde{W}_T (F \times H_d \times F')$$

$$W_N = \tilde{W}_T$$

where $W_S$ defines the transfer function between original transmitted vector S and estimated vector at the output of TDE equalizer and $W_N$ defines the transfer function from input noise vector to the output of equalizer. Both the matrices $W_S$ and $W_N$ have circulant structure (hence the effective SINR for all elements of S are the equal). We can therefore only consider the first rows of these two matrices:

$$w_S \triangleq W_S(1,:)$$

$$w_N \triangleq W_N(1,:)$$

Given this circulant structure, the effective signal-to-interference-noise-ratio (SINR) for each element of $\hat{S}$ is the same and given as:

$$SINR = \frac{|w_S(1)|^2}{\sum_{i=2}^{i=M} |w_S(i)|^2 + \|w_N\|^2 \sigma_N^2}$$

This is the used as optimization cost function as follows:

$$\text{optimal beamforming coefficients } C_{opt} = \arg\left(\max_{C \text{ where } \|C\|=1} SINR\right)$$

where "equivalent time-domain response of channel post-beamforming" h (and consequently H) are functions of beamforming coefficient C.

It should be noted that while specific examples are presented above, other post equalization performance data 302 can be implemented in other embodiments.

Figure 4:
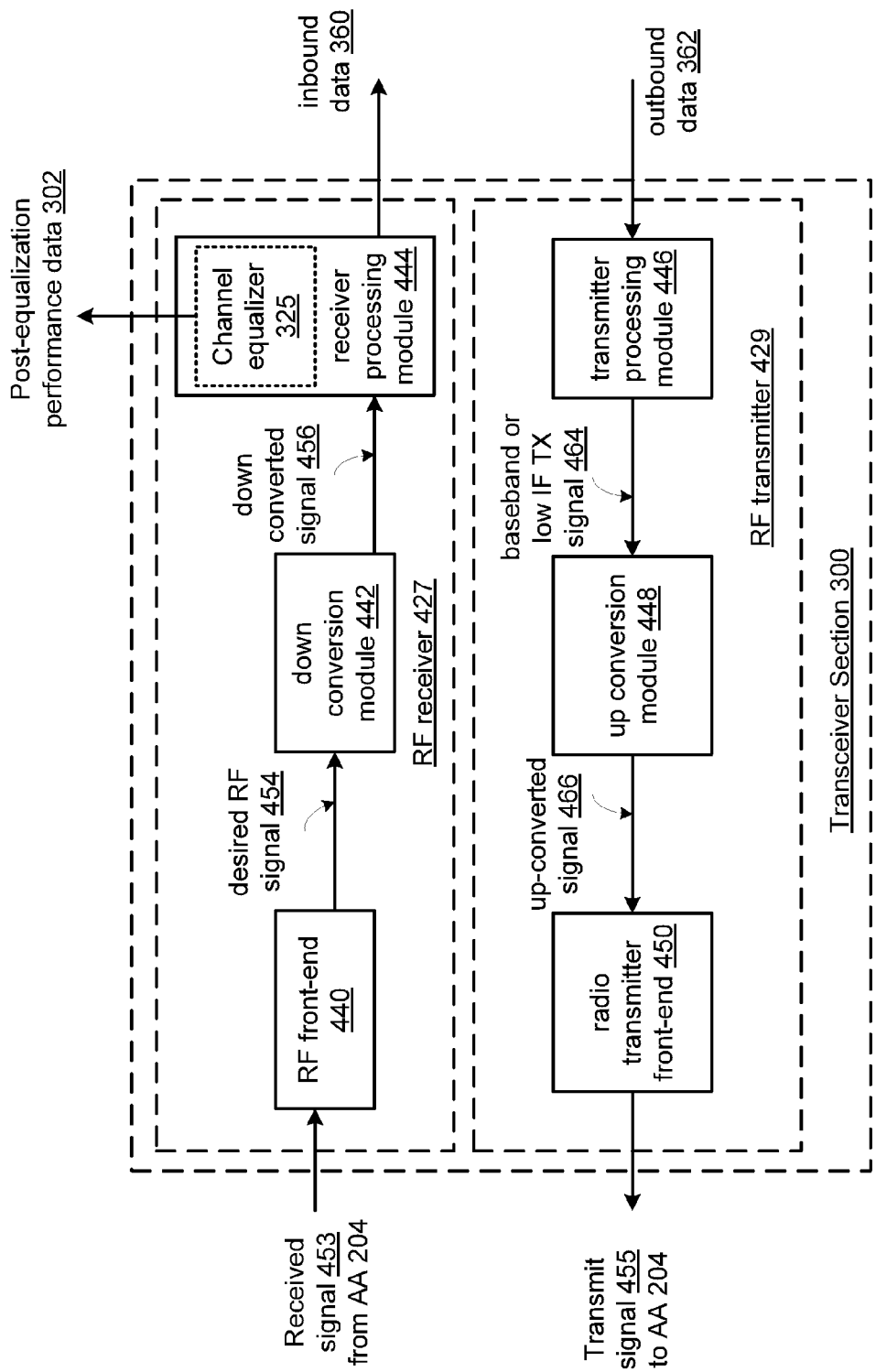
FIG. 4 is a schematic block diagram of an embodiment of a transceiver section 300.

FIG. 4 is a schematic block diagram of an embodiment of a transceiver section 300. The transceiver section 300 includes an RF transmitter 429 and an RF receiver 427. The RF receiver 427 includes a RF front end 440, a down conversion module 442 and a receiver processing module 444. The RF transmitter 429 includes a transmitter processing module 446, an up conversion module 448, and a radio transmitter front-end 450.

In particular, the RF transmitter 429 generates a transmit signal 455 that is sent via array antenna 204 in a millimeter wave or other frequency band to a remote communication device. The transmit signal 455 is generated by RF transmitter 429 based on single-carrier modulation of outbound data 362.

In operation, the RF transmitter 429 receives outbound data 362. The transmitter processing module 446 packetizes outbound data 362 in accordance with a millimeter wave protocol or wireless telephony protocol, either standard or proprietary, to produce baseband or low intermediate frequency (IF) transmit (TX) signals 464 that includes an outbound symbol stream that contains outbound data 362. The baseband or low IF TX signals 464 may be digital baseband signals (e.g., have a zero IF) or digital low IF signals, where the low IF typically will be in a frequency range of one hundred kilohertz to a few megahertz. Note that the processing performed by the transmitter processing module 446 can include, but is not limited to, scrambling, encoding, puncturing, mapping, modulation, and/or digital baseband to IF conversion.

The up conversion module 448 includes a digital-to-analog conversion (DAC) module, a filtering and/or gain module, and a mixing section. The DAC module converts the baseband or low IF TX signals 464 from the digital domain to the analog domain. The filtering and/or gain module filters and/or adjusts the gain of the analog signals prior to providing it to the mixing section. The mixing section converts the analog baseband or low IF signals into up-converted signals 466 based on a transmitter local oscillation.

The radio transmitter front end 450 includes a power amplifier and may also include a transmit filter module. The power amplifier amplifies the up-converted signals 466 to produce transmit signal 455 which may be filtered by a transmitter filter module, if included.

The RF receiver 427 generates inbound data 360 based on a received signal 453 received from the remote communication device via array antenna 204. The received signal 453 is amplified and optionally filtered by the receiver front-end 440 that generates a desired RF signal 454. The down conversion module 442 includes a mixing section, an analog to digital conversion (ADC) module, and may also include a filtering and/or gain module. The mixing section converts the desired RF signal 454 into a down converted signal 456 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 456 that includes an inbound symbol stream. Note that the ordering of the ADC module and filtering and/or gain module may be switched, such that the filtering and/or gain module is an analog module.

The receiver processing module 444 processes the baseband or low IF signal 456 in accordance with a millimeter wave protocol, either standard or proprietary to produce inbound data 360. The processing performed by the receiver processing module 444 can include, but is not limited to, digital intermediate frequency to baseband conversion, demodulation, demapping, depuncturing, decoding, and/or descrambling. The receiver processing module 444 further includes a channel equalizer 325 used in baseband processing to generate inbound data 360. The channel equalizer 325 also generates the post equalization performance data 302 used for beamform control as previously discussed in conjunction with FIG. 3. The channel equalizer 325 can include a single input frequency domain equalizer, a single input time domain equalizer or other channel equalization.

In an embodiment, receiver processing module 444 and transmitter processing module 446 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry. While the processing module 444 and transmitter processing module 446 are shown separately, it should be understood that these elements could be implemented separately, together through the operation of one or more shared processing devices used for baseband processing of multiple RF sections or in any other combination of separate and/or shared processing.

FIG. 5 is a flow diagram of an embodiment of a method. In particular, a method is presented for use in conjunction with the functions and features described in conjunction with FIGS. 1-4. Step 500 includes generating a transmit signal to a remote communication device based on outbound data. Step 502 includes generating inbound data based on a received signal from the remote communication device, wherein generating the inbound data includes a channel equalization. Step 504 includes generating post equalization performance data based on the channel equalization. Step 506 includes generating a plurality of beamforming weights to adjust a beamforming pattern of an antenna array based on the post equalization performance data.

In an embodiment, the transmit signal is generated based on single-carrier modulation and the antenna array includes a plurality of RF domain phase shifters that operate based on the plurality of beamforming weights. The transmit signal can be in a millimeter wave frequency band. Step 506 can include performing a search over a plurality of candidate beamforming patterns to optimize the post equalization performance data. Step 506 can include performing a search over a plurality of candidate beamforming patterns to optimize the post equalization performance data jointly with optimization of a channel equalization by the channel equalizer. The remote communication device can be a non-beamforming or itself a beamforming device.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A radio frequency (RF) transceiver for use with an antenna array having a plurality of RF domain phase shifters that operate based on a plurality of beamforming weights, the RF transceiver comprising:
    an RF transmitter, coupled to the antenna array, operable to generate a transmit signal in a millimeter wave frequency band to a remote communication device based on single-carrier modulation of outbound data;
    an RF receiver, coupled to the antenna array, operable to generate inbound data based on a received signal from the remote communication device, wherein the RF receiver includes a single-carrier channel equalizer configured to select either time domain equalization or frequency domain equalization and wherein the single-carrier channel equalizer generates single carrier post equalization performance data; and
    a beamform controller, coupled to the RF receiver and the antenna array, operable to generate the plurality of beamforming weights to adjust a beamforming pattern of the antenna array in accordance with the single-carrier modulation, based on the single carrier post equalization performance data, wherein the beamform controller generates the plurality of beamforming weights based on both time domain equalization and frequency domain equalization of the single-carrier channel equalizer and wherein adjusting the beamform pattern of the antenna array in accordance with the single-carrier modulation includes modifying the beamform pattern in response to a change in selection of the single-carrier channel equalizer of either the time domain equalization or the frequency domain equalization.

2. The RF transceiver of claim 1 wherein the single-carrier channel equalizer includes a single input frequency domain equalizer configured for the frequency domain equalization.

3. The RF transceiver of claim 1 wherein the single-carrier channel equalizer includes a single input time domain equalizer configured for the time domain equalization.

4. The RF transceiver of claim 1 wherein the beamform controller performs a search over a plurality of candidate beamforming patterns to optimize the single carrier post equalization performance data.

5. The RF transceiver of claim 1 wherein the beamform controller performs a search over a plurality of candidate beamforming patterns to optimize the single carrier post equalization performance data jointly with optimization of a single-carrier channel equalization by the single-carrier channel equalizer.

6. The RF transceiver of claim 1 wherein the change in selection of the single-carrier channel equalizer of either the time domain equalization or the frequency domain equalization includes one of: the change from the time domain equalization to the frequency domain equalization, or the change from the frequency domain equalization to the time domain equalization.

7. The RF transceiver of claim 1 wherein the remote communication device is a non-beamforming device.

8. A radio frequency (RF) transceiver for use with an antenna array, the RF transceiver comprising:
    an RF transmitter, coupled to the antenna array, operable to generate a transmit signal to a remote communication device based on outbound data;
    an RF receiver, coupled to the antenna array, operable to generate inbound data based on a received signal from the remote communication device, wherein the RF receiver includes a single-carrier channel equalizer that operates based on a single input and is configured to select either time domain equalization or frequency domain equalization and wherein the single-carrier channel equalizer generates single carrier post equalization performance data; and
    a beamform controller, coupled to the RF receiver and the antenna array, operable to generate a plurality of beamforming weights in accordance with a single-carrier modulation to adjust a beamforming pattern of the antenna array based on the single carrier post equalization performance data, wherein the beamform controller generates the plurality of beamforming weights based on both time domain equalization and frequency domain equalization of the single-carrier channel equalizer and wherein adjusting the beamform pattern of the antenna array includes modifying the beamform pattern in response to a change in selection of the single-carrier channel equalizer of either the time domain equalization or the frequency domain equalization.

9. The RF transceiver of claim 8 wherein the change in selection of the single-carrier channel equalizer of either the time domain equalization or the frequency domain equalization includes the change from the time domain equalization to the frequency domain equalization.

10. The RF transceiver of claim 8 wherein the change in selection of the single-carrier channel equalizer of either the time domain equalization or the frequency domain equalization includes the change from the frequency domain equalization to the time domain equalization.

11. The RF transceiver of claim 8 wherein the beamform controller performs a search over a plurality of candidate beamforming patterns to optimize the single carrier post equalization performance data.

12. The RF transceiver of claim 8 wherein the beamform controller performs a search over a plurality of candidate beamforming patterns to optimize the single carrier post equalization performance data jointly with optimization of a single-carrier channel equalization by the single-carrier channel equalizer.

13. The RF transceiver of claim 8 wherein the remote communication device is a beamforming device.

14. The RF transceiver of claim 8 wherein the remote communication device is a non-beamforming device.

15. A method comprising:
generating a transmit signal to a remote communication device based on outbound data;
generating inbound data based on a received signal from the remote communication device, wherein generating the inbound data includes a single-carrier channel equalization;
generating single carrier post equalization performance data based on the single-carrier channel equalization based on selection of either time domain equalization or frequency domain equalization; and
generating a plurality of beamforming weights to adjust a beamforming pattern of an antenna array in accordance with a single-carrier modulation, based on based on both time domain equalization and frequency domain equalization and wherein adjusting the beamform pattern of the antenna array includes modifying the beamform pattern in response to a change in selection of either the time domain equalization or the frequency domain equalization.

16. The method of claim 15 wherein the transmit signal is generated based on the single-carrier modulation and wherein the antenna array includes a plurality of RF domain phase shifters that operate based on the plurality of beamforming weights.

17. The method of claim 15 wherein the transmit signal is in a millimeter wave frequency band.

18. The method of claim 15 wherein generating the plurality of beamforming weights includes performing a search over a plurality of candidate beamforming patterns to optimize the single carrier post equalization performance data.

19. The method of claim 15 wherein generating the plurality of beamforming weights includes performing a search over a plurality of candidate beamforming patterns to optimize the single carrier post equalization performance data jointly with optimization of the single-carrier channel equalization.

20. The method of claim 15 wherein the remote communication device is a non-beamforming device.

* * * * *